Patented Aug. 10, 1943

2,326,516

UNITED STATES PATENT OFFICE 2,326,516

COMPRESSED AND DENSIFIED PRODUCT AND THE METHOD OF MAKING THE SAME

George B. Brown, Manville, N. J., assignor to Johns-Manville Corporation, New York, N. Y., a corporation of New York No Drawing. Application January 19, 1940, Serial No. 314,692

4 Claims. (Cl. 106—120)

This invention relates to a compressed and densified fibrous product and the method of making the same, and particularly to such a product in which calcium silicate binder is formed in contact with the fibres bound thereby and in the presence of a relatively small proportion of water.

It is an object of the invention to provide a strong yet non-brittle sheet or block containing a large proportion of fibres and preserving in general the fibrous nature while being substantially impermeable to air. Another object is to make a fibreboard that is fireproof, relatively inexpensive, strong but light weight, durable when exposed to the action of weather or to soaking in water for a substantial period of time, and has relatively low thermal conductivity. Other objects and advantages will appear from the more detailed description that follows.

The invention comprises the herein described novel features of the product and the method of making it and, more particularly, a sheet in compressed and hardened condition including a large proportion of fibres and a binder therefor, said binder including the reaction product of a wet mixture of hydrated lime and finely divided silica of very low density. The invention comprises such a sheet in which the fibres include a substantial proportion of amphibole asbestos fibres. The invention comprises also the method of making such a product in which there is formed an aqueous mixture of the selected fibres, hydrated lime and finely divided silica such as diatomaceous earth, shaping and strongly compressing the mixture against a filtering member to remove the major portion of the water present and then autoclaving the shaped and compressed material at an elevated temperature to cause practically complete reaction of the lime with the silica, the silica being used preferably in amount in slight excess of the stoichiometric proportions.

In making the articles of the present invention, there is used a method which comprises forming an aqueous mixture with the selected fibres, hydrated lime and finely divided silica, shaping and strongly compressing the mixture, to expel therefrom a large portion of the water present and form a densified mixture, and then subjecting the shaped and compressed material to an elevated temperature while minimizing the evaporation of water. This latter step is preferably accomplished by placing the shaped product in an autoclave in the presence of steam at superatmospheric pressure. There is thus caused a substantially complete reaction between the lime and the finely divided silica. Finally, the product is dried at a temperature above the boiling point of water to remove free water.

Particularly desirable results have been obtained when the finely divided silica is diatomaceous earth. Such silica not only causes a quick reaction with the lime during the heating at an elevated temperature, but also makes possible the production of a lightweight article suitable for use as a ship panel or a thermal insulating wall board. It further permits the use of the binder in such relatively small proportions with respect to the weight of the fibres as to preserve non-brittleness and appreciable flexibility in the finished article.

For the fibrous component I have used to advantage amphibole asbestos fibres which include amosite, anthophyllite, crocidolite, actinolite and tremolite fibres. It is desirable that the fibrous components used in the manufacture of the product of my invention have a water of crystallization or composition not in excess of 5% since the thermal conductivity of the finished products increases very rapidly if the fibres have a water of crystallization in excess of the quantity indicated. Products constituted largely of amosite fibres, which have a water of crystallization of about 4.7%, have been found to give very desirable results in the finished product and are, therefore, preferred. The feature of low thermal conductivity is a very desirable feature in my finished product and should not exceed 1 (measured in B. t. u.'s, inches per hour per square foot per °F.) on a product having a density in the order of 40 lbs. per cu. ft. when measured at a mean temperature of 100° F. Amosite fibres have a water of crystallization of less than 5% and when made into a sheet, according to the method herein described, the resulting product has a thermal conductivity of less than 1. It is, therefore, recommended that amosite fibres be used either entirely or in large proportions in the preparation of the product of my invention. The amosite fibre content may be modified to some degree by replacing small proportions of the amosite fibres with chrysotile fibres or with wood screenings. It is, however, desirable that the amosite fibres should not be replaced with more than about 10 to 25% of the modifying material based on the total weight of the finished product. The physical characteristics of the finished product which include fibrous materials other than amosite fibres may, however, be less desirable than those products containing only amosite fibres, and therefore, it is preferred that only amosite fibres or a substantial proportion thereof should be used. In any event, at least 50% of the fibrous content in the finished article should be amphibole fibres.

In order to obtain the desired properties in the finished bonded fibrous product I have used to advantage a large proportion of fibres at least equal approximately to the weight of the lime and silica used. For instance, I have used 50 parts by weight of amosite fibres to 100 parts by weight of the finished bonded article in dried condition. Also, I have used fibrous components in the proportion of 35 to 60 parts by weight to 100 parts of the finished dried article.

The method of manufacture is illustrated in greater detail by the following more specific example:

There is formed a mixture including 50% of amosite fibres, 25% hydrated lime and 25% of comminuted diatomaceous earth and water in the amount to permit the suspension of the solid ingredients in a fluid composition. The quantity of water is about 1500% of the total weight of the solid ingredients in the mixture.

The mixture is then agitated to form a slurry, the slurry is charged to the bed of a press having a filtering body such as a firmly supported wire screen anchored to a drain so that the slurry flows over the screen and forms a layer of substantially uniform thickness over all parts thereof. The amount of slurry used is selected to give the desired final thickness of the compressed sheet which is approximately .5 to 1.5 inches.

Strong compression is then applied as by bringing down the ram of a hydraulic press upon the mixture on the filtering bed. The pressure on the ram may be varied within limits from about 200 to 1300 lbs. per square inch although I have found that a pressure in the order of 500 lbs. gives a very desirable product from the standpoint of proper balance between strength and lightness of the material.

During the strong compression described, a large proportion of the water in the slurry is forced therefrom and the mixture is compressed to form a densified and thoroughly consolidated mass including a very small proportion of water in comparison with the amount originally present. Thus the compressed product ordinarily contains about 40 to 70 parts of water to 100 parts of solid present.

The reaction of the lime and the silica which will be described in the next step occurs therefore in the presence of a small proportion of water and a bond of strong calcium silicate is formed even though the proportion of the calcium silicate is relatively low in comparison to the proportion of such bond in articles of somewhat similar quantitative composition made heretofore. It has been found that when the materials are compressed under about 500# pressure the densities of the finished products vary between 35 to 45# per cu. ft. The finished products which weigh about 40# per cu. ft. give very desirable results in that they possess low heat conductivity and a high modulus of rupture.

The shaped and compressed material is removed from the press in any suitable manner and subjected to an elevated temperature to cause substantially complete reaction between the lime and the silica, that is, to cause one of the reactive ingredients which is not present in excess to be combined practically and entirely as calcium silicate. Inasmuch as the lime and the silica are originally present in approximate stoichiometric proportions, the lime and the silica will be substantially completely reacted. It is preferable, however, that the silica be present in slight excess in order that all the lime will be substantially completely reacted. The occurrence of this reaction in the presence of water results in the combination of some of the water with the fibres, presumably as water of hydration, and the intimate association of the resulting silicate hydrated with the fibres makes possible additional hardening of the binder by drying.

The reaction described is effected quite satisfactorily in an autoclave heated by live steam at superatmospheric pressure as, for example, at a gauge pressure of 100 to 150# per square inch. In the autoclaving step I allow the steam to enter slowly from an inlet so that the pressure is not built up suddenly to the maximum desired. Thus, I have raised the pressure on the gauge from 0 to 150# at the rate of about 25# per hour to minimize splitting or swelling of the sheet during the steam curing operation.

The steam cured product is then subjected to thorough drying, preferably at a temperature well above the boiling point of water to cause the removal of substantially all free water from any calcium silicate that may exist in gelatinous or other form intimately associated with a large excess of water as distinguished from water of hydration that is expelled only at very high temperatures. Thus, I have dried the product at a temperature of about 250° F. for about 48 hours. After drying, the product may be shaped to the exact size desired. One face of the sheets as made in the press is generally a practically plane surface.

A sheet so made has been found to weigh approximately 40# to the cu. foot, has a specific thermal conductivity (measured in B. t. u.'s, inches per hour per square foot per °F.) of only about .55, to be fireproof, flexible to an appreciable extent, strong (having a modulus of rupture in the order of about 1800 lbs./sq. in.) and impermeable to air to such degree that the board is adapted for use as structural panels, as, for example, for walls of buildings, or bulk heads of ships.

It has been found that products in which amphibole fibres are used entirely or in the proportions indicated above, the products which are compressed so that the density of the finished product is within the limits of 35 to 45 pounds per cu. ft., the modulus of rupture exceeds 1500 pounds per square inch, and the thermal conductivity is less than 1 when measured at mean temperatures of 100° F. In using the term "mean temperature," I refer to the temperature at a point half way between the opposite walls or faces of the product.

During the autoclaving step described above, I confine the sheets in such a manner as to cause welding together at positions where permanent cracking would otherwise develop as steam escapes from the sheets. In this manner the development of cracks and attendant weakening of the structure are minimized, thus the sheets being steam cured may be stacked one upon another with impermeable material as for example, two or three sheets of asbestos-cement board of ½ inch thickness, each laid over the top of the stack. At the bottom, the stack may rest upon the steel floor of a conventional handtruck. Obviously, if the stack is very tall intermediate spacing members may be used to permit access of the heating medium, such as the steam, to the interior of the stack.

As another means of minimizing cracking, there may be used a small proportion of a skeletonizing agent admixed into the composition of the sheets and allowed to set or harden before the sheets are subject to autoclaving. For this purpose there may be used a small proportion of hydraulic cement as, for example, 10 to 20% of Portland cement or a calcium aluminate cement based on the weight of the finished article. The cement is thoroughly mixed with the other raw materials, the composition then formed into sheets as described, with cement in the sheet allowed to set substantially fully, or to a large extent, then the sheet autoclaved in the manner described.

For some purposes, an oxide of any of the other alkaline earths may be substituted for the lime. When such oxide is so slightly soluble as not to react sufficiently rapidly with the silica then there may be used a promoter to accelerate the reaction. Thus, finely divided magnesia may be substituted in equi-molecular proportion for the lime with the addition to the magnesia of about 1 mol of sodium carbonate for each 10 mols of magnesia.

This application is a continuation in part of my copending application, Serial No. 91,268 filed July 18, 1936, issued as Patent No. 2,247,355.

It will be understood that the details given are for the purpose of illustration not restriction, and that variations within the spirit of the invention are intended to be included in the scope of the appended claims.

I claim:

1. An article of manufacture consisting of a heat insulating sheet having a high modulus of rupture and comprising asbestos fibers and a binder, the binder including the product of a substantially complete reaction under the influence of steam of an aqueous mixture of hydrated lime and finely divided silica, the fibres constituting at least half of the dry weight of the article and at least 50% of the fibers being amosite fibers, and said article having a dry density below 45 lbs. per cubic foot and a thermal conductivity of less than 1 when measured at a mean temperature of 100° F.

2. An article of manufacture consisting of a heat insulating sheet having a high modulus of rupture and comprising amosite fibers and a binder, the binder including the product of the substantially complete reaction under the influence of steam of an aqueous mixture of hydrated lime and finely divided diatomaceous earth, said amosite fibres constituting at least 35% of the dry weight of the article, and said article having a dry density of less than 45 lbs. per cubic foot, and a thermal conductivity of less than 1 when measured at a mean temperature of 100° F.

3. An article of manufacture consisting of a heat insulating sheet having a high modulus of rupture and comprising 35–60 parts by weight of asbestos fibers and 40–65 parts of a binder, the binder including the product of the substantially complete reaction under the influence of steam of an aqueous mixture of hydrated lime and finely divided diatomaceous earth, said fibrous portion including at least 50% amosite fibres, and said article having a dry density of 35–45 lbs. per cubic foot and a thermal conductivity of less than 1 when measured at a mean temperature of 100° F.

4. A felted light-weight heat insulating material which comprises amosite asbestos fibers and a binder bonding the fibres into a sheet, the binder including the product of the substantially complete reaction under the influence of steam of an aqueous mixture of substantially stoichiometric proportions of hydrated lime and finely divided silica, the amosite fibres having a water of crystalization of less than 5 per cent., and constituting 35%–60% of the dry weight of the finished material, said material having a density in the order of 40 pounds per cubic foot, a modulus of rupture of at least 1500 lbs. per square inch and a thermal conductivity of less than 1 when measured at a mean temperature of 100° F.

GEORGE B. BROWN